United States Patent Office 3,436,634
Patented Apr. 1, 1969

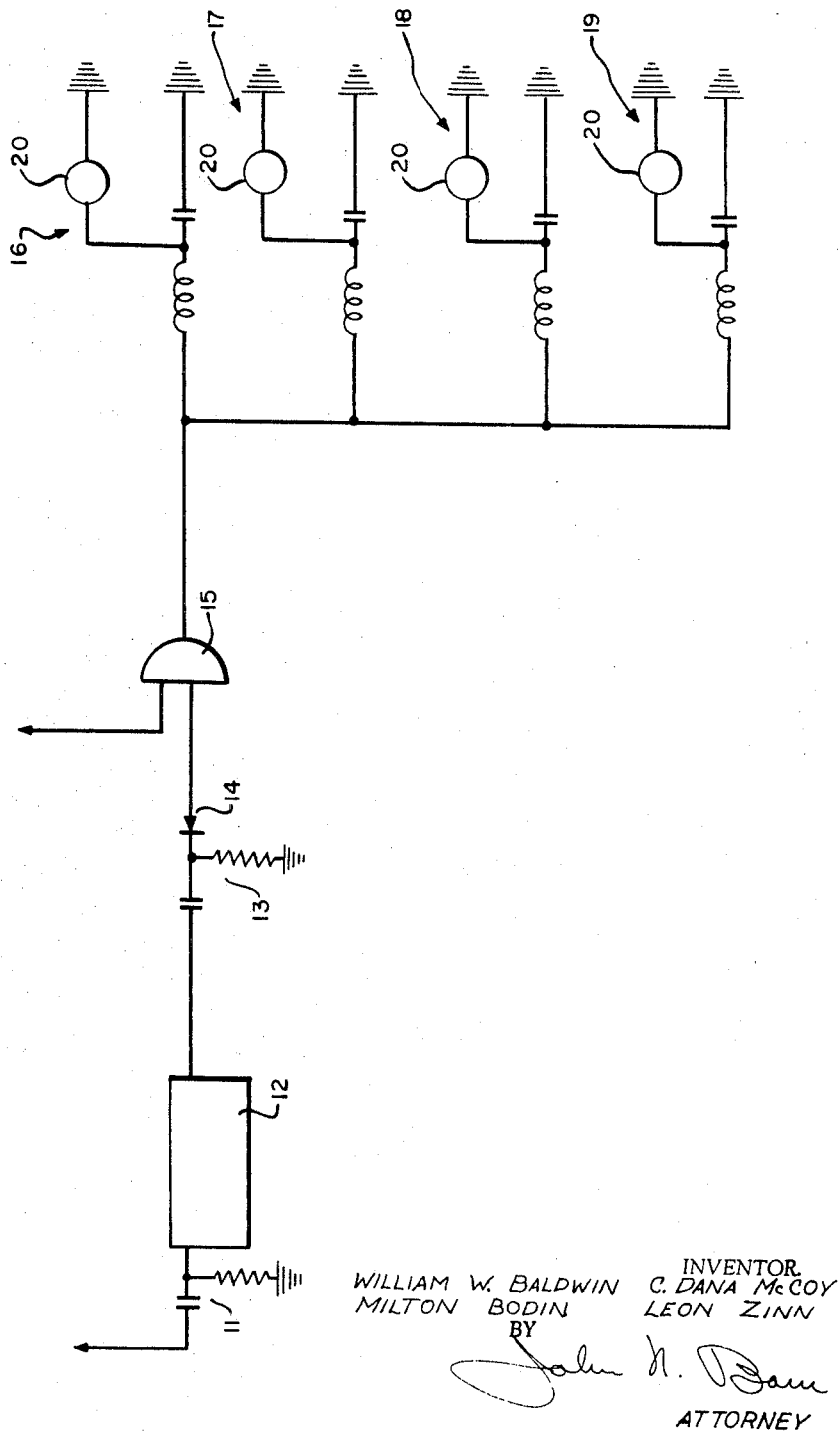

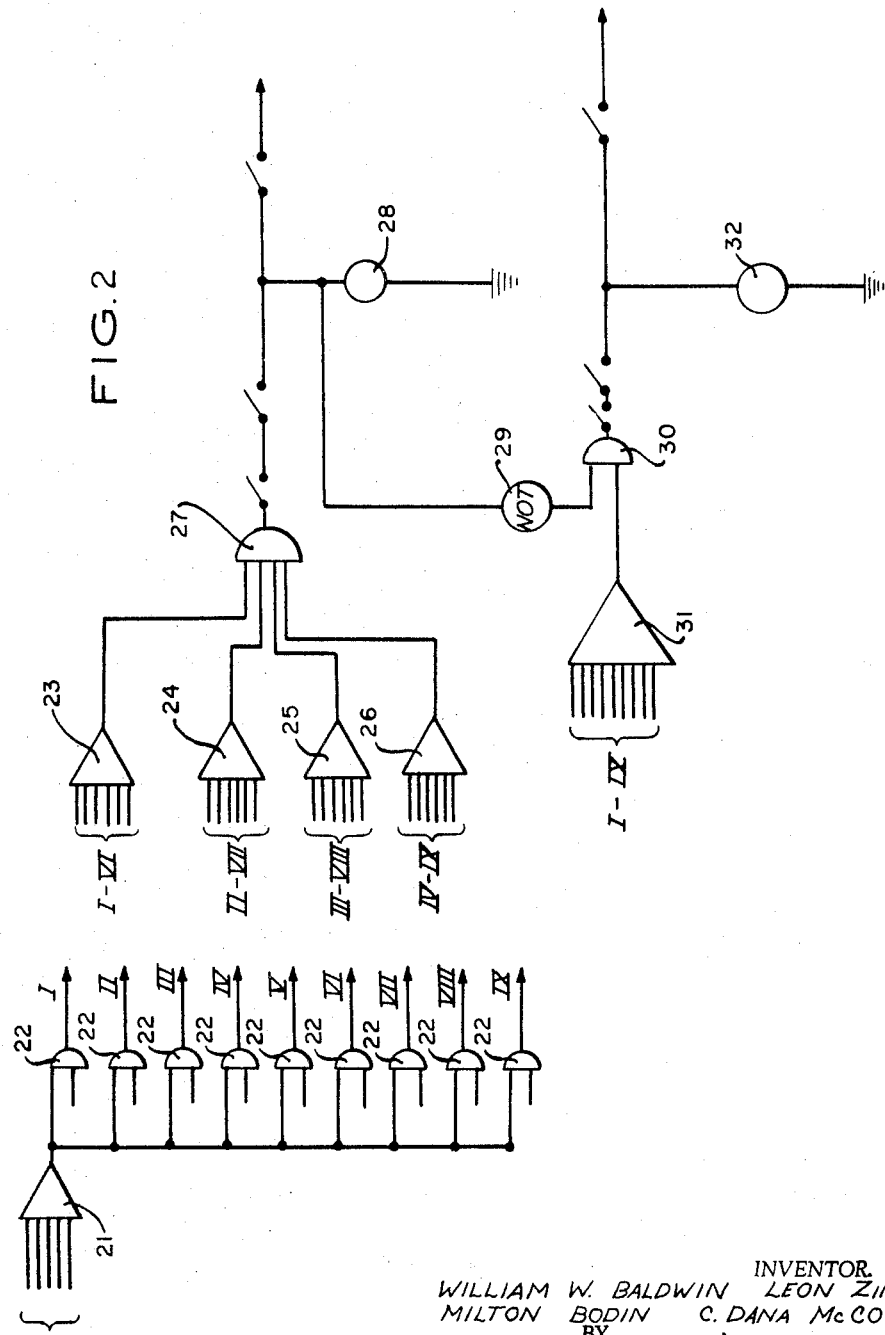

3,436,634
MOTOR SPEED CONTROL SYSTEM
William W. Baldwin, 45 East End Ave., New York, N.Y.
10028; C. Dana McCoy, 1054 Barnegat Lane, Manto-
loking, N.J. 08738; Milton Bodin, 176 Copley Ave.,
Teaneck Township, Bergen County, N.J. 07666; and
Leon Zinn, 8 Circle Drive, Syosset, N.Y. 11791
Original application Apr. 1, 1964, Ser. No. 356,417.
Divided and this application Apr. 4, 1966, Ser. No.
540,084
Int. Cl. H02p 7/00
U.S. Cl. 318—318          10 Claims

ABSTRACT OF THE DISCLOSURE

A motor control system for automatically controlling motor speed. A wave having a predetermined width and a tachometer generated frequency dependent signal are input into a coincidence circuit thus passing through an output signal of a particular frequency and into a plurality of tuned circuits where one of the tuned circuits will energize an associated locking relay which in turn inserts a predetermined value of resistance into the motor circuit.

Background of invention

The present invention relates to motor control systems for controlling acceleration and deceleration and is a division of co-pending application Ser. No. 356,417 filed in the United States Patent Office on Apr. 1, 1964, now abandoned.

The motor control system disclosed and claimed herein is particularly useful for automatically controlling the rate of acceleration and deceleration of motors which are under varying loads. If such motors are insensitive to load, the rate of acceleration and deceleration is likely to be either excessively fast or excessively slow. For instance, in certain material handling systems, aisles of pallets are positioned in end to end abutting relationship and are simultaneously driven along the aisles by a single motor. The condition of load of the pallets varies from movement to movement from a totally unloaded condition wherein none of the pallets contain loads to a fully loaded condition wherein all pallets are loaded. Obviously, the inertia of the combined pallets varies quite considerably between these extremes. If motor control means sensitive to the state of load of the pallets are not provided, the pallets will tend to either accelerate or decelerate too rapidly when the pallets are unloaded or lightly loaded and too slowly when fully or heavily loaded.

The rate of acceleration of the motor driving the pallets is a function of the load. In the present invention, the motor is provided with speed sensing means which generate a signal as a function of motor speed during a period of sampling. The output signal from the motor speed sensing means is imposed upon speed selector means which dependent upon the signal from the motor speed sensing means in turn generates different signals to motor speed control means. The signal from the selector means varies in accordance with the input signal thereto from the motor speed sensing means. The signal to the motor speed control means operates to vary the speed of the motor by any one of a number of well known means.

Thus, it is among the objects and advantages of the present invention to provide an automatic motor control system sensitive to motor loads to control the rate of acceleration and deceleration as a function of load.

Summary of invention

A motor control system comprising motor speed sensing means for providing an output signal in accordance with the speed of the motor, speed selector means, motor speed control means, said speed selector means being operative to transmit different signals to said motor speed control means for predetermined lengths of time at spaced intervals of time in accordance with different output signals from said motor speed sensing means, said motor speed control means being operative to vary the speed of said motor in accordance with signals received from said speed selector means.

Preferred embodiment of invention

The objects and advantages aforesaid as well as other objects and advantages may be achieved by the motor control systems preferred embodiments of which are illustrated in the drawings in which:

FIGURE 1 is an electrical circuit diagram of a motor acceleration and deceleration control system; and FIGURE 2 is an electrical circuit diagram for an alternative motor acceleration and deceleration control system.

FIGURE 1 illustrates an electrical wiring diagram employed to control acceleration and deceleration of the motors generating movement in both the pallets and the loader. This wiring diagram is particularly adapted to automatically pick out a value of resistance to be applied to the input power signal to a motor so as to control acceleration. A DC signal from the motor starter relay is imposed upon a CR circuit also known as a differentiating circuit 11. The CR circuit differentiates the DC signal converting it into a positive pulse or marker signal which is input into a 1-shot multivibrator 12. The 1-shot multi-vibrator generates a positive square wave having a given period of time. This square wave is imposed upon a second CR circuit 13 having a diode 14 connected thereto. The diode 14 permits only negative voltage to pass therethrough. Thus, on the output side of the diode 14, there is generated a marker wave for a particular period of time having a particular width which can be adjusted by the CR circuit 13. This signal is the input into an AND circuit 15. The AND circuit 15 is also fed by a frequency taken from the motor. The frequency may be in the form of a tachometer generated EMF or some other EMF related to the rotational speed of the motor. The AND circuit 15 will fire only during the pre-set time derived from the second CR circuit 13 passing through the diode 14. Thus, only a particular frequency will pass through and into a plurality of tuned resonating circuits 16, 17, 18 and 19. One of the tuned circuits 16 through 19 will resonate with the particular frequency generated from the AND circuit 15 and will thus fire a locking relay 20 connected thereto. The particular locking relay 20 energizes a pre-determined value of resistance across the input power to the polyphase windings of the particular squirrel-cage motor to which it is connected. Thus, the motor input power is decreased by a particular value of resistance which has been chosen according to its initial speed of rotation. In the event that the initial speed of rotation is extremely high, a high value of resistance is chosen to quickly reduce acceleration of the motor. Conversely, if the initial rotation of the motor is extremely slow a lower value of resistance will be applied thereby permitting greater power to accelerate the motor.

Similarly, deceleration of the motor may be affected by imposing a DC current onto the polyphase windings of the squirrel cage motor. The same sort of control circuit is employed to determine the value of this DC current. In addition, it should be noted that the signal input into the AND circuit derived from the motor need not necessarily be frequency oriented but can also be amplitude oriented related to the EMF. Thus, the motor would be amplitude controlled rather than speed of rotation controlled.

FIGURE 2 illustrates an alternative motor acceleration and deceleration control wiring diagram. Here too, a value of resistance to be placed in series with the input signal of the motor is chosen. A constant signal, as for instance, from a pallet position indicator not described or illustrated, is input into an OR circuit 21. For purposes of this illustration, it has been assumed that pallets are positioned in a pair of parallel aisles, the pallets being movable along the aisles in each direction and transversely from aisle to aisle at opposite ends thereof. Each of the aisles may be assumed to be five pallets in length. However, at all times, the closed circuit of pallets has one fewer pallets than there are positions. Thus, there are nine pallets in the circuit, five pallets in one aisle and four in the other aisle with an empty space at the end of the aisle containing four pallets. If any one of the pallets is loaded in one of the aisles, a signal passes into a plurality of AND circuits 22 equal in number to the number of pallets in the particular circuit. A signal is fed into the AND circuit from a pallet-loaded indicator. Thus, one of the AND circuits 22 will fire if signals from two inputs are supplied to the AND circuit simultaneously. The output from the firing AND circuit 22 is input into a plurality (shown in the drawing to be 4 in number) of OR circuits 23, 24, 25 and 26. OR circuit 23 contains connections for input signals from pallets 1 through 6; OR circuit 24 contains connections for input from pallets 2 through 7; OR circuit 25 contains connections for inputs from pallets 3 through 8 and OR circuit 26 contains connections for inputs from pallets 4 through 9. Each of the OR circuits 23, 24, 25 and 26 are connected to an AND circuit 27. If no pallet is located, the AND circuit 27 will not fire and a full value of resistance will be applied to the drive motor to decrease acceleration due to the low load bearing thereupon. However, if the AND circuit 27 is energized, it means that current is passing from all four of the OR circuits 23, 24, 25 and 26. This in turn means that at least four pallets are loaded and relay 28 closes. If relay 28 closes, the value of resistance is chosen to slightly increase acceleration of the motor. If relay 28 is not closed the NOT circuit 29 will be energized passing current into another AND circuit 30 which in turn is connected to an OR circuit, 31. The OR circuit 31 is connected to pallets 1 through 9. If a signal is coming from OR circuit 31 and NOT circuit 29, AND circuit 30 will fire closing relay 32. This, by logic, means that at least one pallet is loaded but less than four pallets are loaded. This same sequence of connections through AND, OR and NOT circuits is repeated to determine the number of pallets, loaded and hence the proper resistadnce to be applied across the motor.

The foregoing description is merely intended to illustrate an embodiment of the invention. The component parts have been shown and described. They each may have substitutes which may perform a substantially similar function; such substitutes may be known as proper substitutes for the said components and may actually have been known or invented before the present invention; these substitutes are contemplated as being within the scope of the appended claims, although they are not specifically catalogued herein.

We claim:

1. A motor control system comprising motor speed sensing means for providing an output signal in accordance with the speed of the motor, speed selector means, motor speed control means, said speed selector means being operative to transmit different signals to said motor speed control means for predetermined lengths of time at spaced intervals of time in accordance with different output signals from said motor speed sensing means, said motor speed control means being operative to vary the speed of said motor in accordance with signals received from said speed selector means.

2. The motor control system of claim 1 wherein said motor speed sensing means provides an output alternating current signal whose frequency is proportionate to the speed of said motor, said speed selector means being operative to respond to produce different output signals in accordance with alternating current signals of different frequencies.

3. The motor control system of claim 1 including sampling means, said sampling means being operative to only supply said motor speed control means with said different signals from said speed selector means for predetermined lengths of time at spaced intervals in time.

4. The motor control system of claim 3 wherein said sampling means is connected between said motor speed sensing means and said speed selector means, and means for delaying the first transmission of a speed sensing means output signal to said speed selector means.

5. The apparatus of claim 3 wherein said motor speed sensing means provides an output alternating current signal proportionate in frequency to the speed of said motor, said speed selector means including a plurality of frequency sensitive circuits responsive to different frequencies and operative to provide different output signals in accordance with the particular frequency supplied thereto from the spaced sensing means.

6. The motor control system of claim 5 wherein said frequency sensitive circuits are tuned resonant circuits having their frequency responsive within the range of speed of said motor.

7. The motor control system of claim 6 wherein said motor speed control means is operative to vary the resistance in the power supply of said motor to effect the changes in the speed thereof, said motor speed control means being operative to vary said resistance proportionate to the speed of said motor.

8. A motor control system comprising a motor, a motor speed sensing means for providing an alternating current signal proportional to the output speed of said motor, gating means, speed selector means operative to sense variations in the frequency of signals from said motor speed sensing means, said speed selector means being operative to provide proportionate output signals in accordance with signals from said speed sensing means, motor speed control means, said motor speed control means being operative to vary the speed of said motor in accordance with signals received from said speed selector means, gate control means, said gate control means being operative to control the connection of said speed sensing means to said speed selector means through said gating means.

9. The motor control system of claim 8 wherein said gate control means includes means for sampling said speed sensing means for predetermined time periods at spaced intervals in time.

10. The motor control system of claim 9 including means for delaying the first application of said gate control means signal to connect said speed sensing means to said speed selector means.

References Cited

UNITED STATES PATENTS

| 3,079,539 | 2/1963 | Guerth | 318—327 X |
| 3,084,307 | 4/1963 | Landis | 318—328 X |
| 3,215,918 | 11/1965 | Lichowsky | 318—314 X |

ORIS L. RADER, *Primary Examiner.*

G. MUNEZ, *Assistant Examiner.*

U.S. Cl. X.R.

318—305, 328, 329